No. 611,878. Patented Oct. 4, 1898.
D. WEBRE & S. HAYDEL.
CANE FEEDER AND CARRIER.
(Application filed July 12, 1897.)
(No Model.)
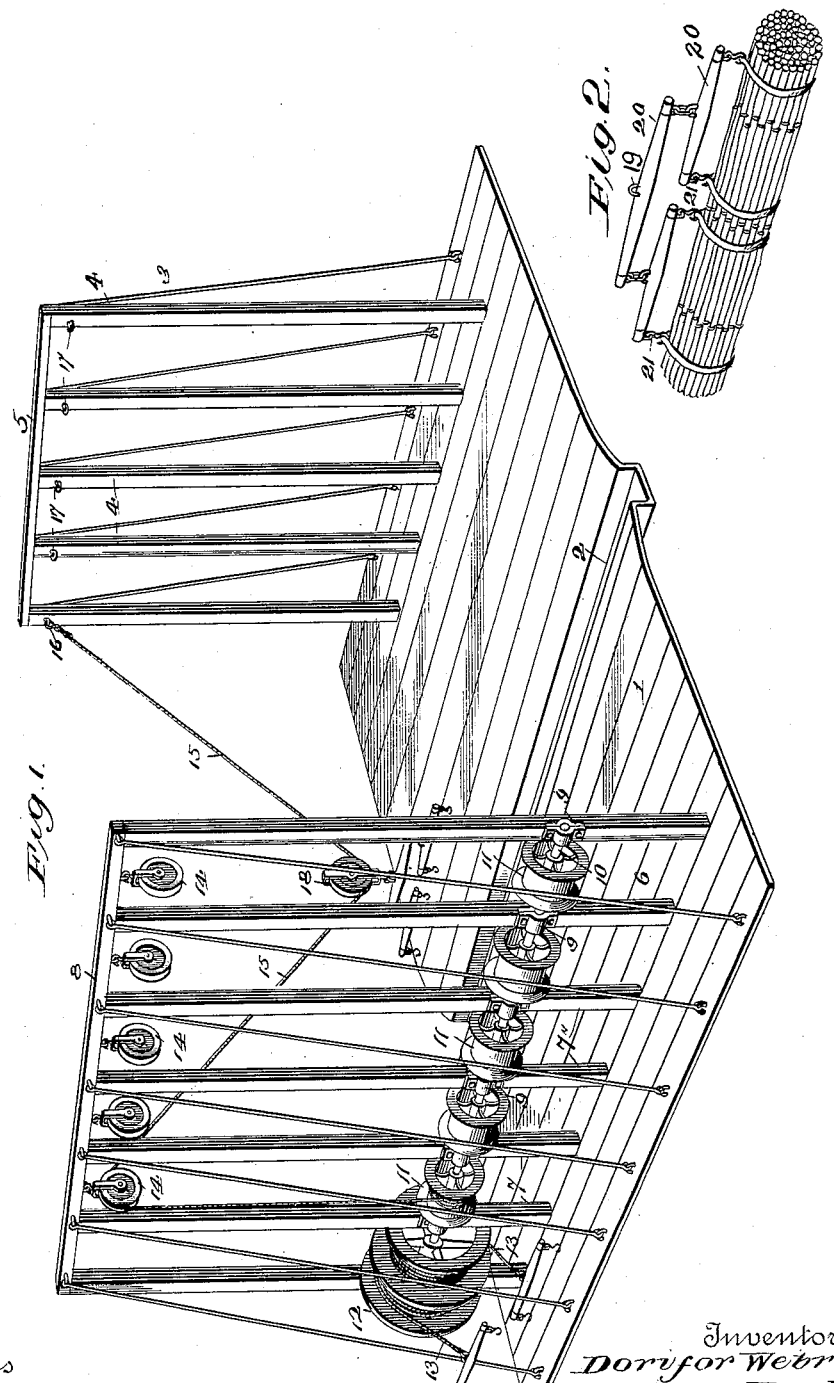

UNITED STATES PATENT OFFICE.

DORIFOR WEBRE AND STEPHENS HAYDEL, OF VACHERIE, LOUISIANA.

CANE FEEDER AND CARRIER.

SPECIFICATION forming part of Letters Patent No. 611,878, dated October 4, 1898.

Application filed July 12, 1897. Serial No. 644,227. (No model.)

*To all whom it may concern:*

Be it known that we, DORIFOR WEBRE and STEPHENS HAYDEL, of Vacherie, in the parish of St. James and State of Louisiana, have invented certain new and useful Improvements in Cane Feeders and Carriers; and we do hereby declare the following to be a full, clear, and exact description of the invention, such as will enable others skilled in the art to which it appertains to make and use the same.

Our invention relates to novel and useful improvements in means for loading and unloading sugar-cane or other similar farm products.

The object of our invention is to produce a device of the character above mentioned that will be especially cheap, simple in construction, durable, and efficient in operation.

A further object of our invention is to produce a device of this character that will require much less labor to load and unload a wagon or carrier than has heretofore been required.

Our invention consists to these ends in the novel features of construction of parts and the combination of such parts, which will be hereinafter fully described.

Other objects and advantages of our invention will become apparent in the course of the following description, and the points of novelty will be particularly pointed out in the claims.

We are enabled to accomplish the objects of our invention by the means illustrated in the accompanying drawings, in which—

Figure 1 represents a perspective view of our improved means for loading and unloading sugar-cane. Fig. 2 represents a detail perspective view of the swivel-bars secured to a bundle of cane.

Referring to the drawings, the numeral 1 indicates a platform which is constructed, preferably, of planks arranged edge to edge, which may be of any desired length.

The numeral 2 indicates a groove which extends longitudinally throughout the entire length of the platform, which platform at the portion adjacent to the groove is slightly inclined toward said groove, the purpose of which will presently become apparent.

The numeral 3 indicates a frame composed of a series of upright bars 4 and a cross brace or bar 5, which frame is mounted upon the platform at one side thereof.

The numeral 6 indicates a frame which is composed of a series of upright bars 7 and a cross bar or brace 8, said frame being located on the side of the platform opposite to the side upon which the bars 4 are mounted.

Journaled in bearings 9, near the lower end of bars 7, is a shaft 10, which extends longitudinally and has mounted thereon in the spaces between the bars 7 a series of drums 11, which are keyed to said shaft and adapted to turn therewith.

The numeral 12 indicates a drum which is mounted in the space between the end bars of the frame 6 and is adapted to have secured thereto and wound thereon the cables or ropes 13, to the ends of which is attached a singletree or other means for securing the cable to the harness of the horse. The cables 13 are wound upon the drum in opposite directions, so that when one cable is being unwound the other is being wound.

The numeral 14 indicates a series of pulley-blocks which are secured to the cross bar or brace 8. Passing through these pulley-blocks is a rope or cable 15, which is provided at one end with a hook 16, which is adapted to enter the eyes 17 on the uprights 4, and its other end extends downwardly from said pulley and is temporarily secured to one of the drums 11 on the shaft 10. Mounted upon the rope or cable 15 and adapted to travel thereon is a pulley-block 18, which is provided at its lower end with a hook 19, to which is secured the swivel-bars 20, which are provided with hooks 21, adapted to be temporarily secured to a bale or bundle of cane when it is desired to lift the same. The bundles or bales of cane are arranged, preferably, in rows on either side of the groove 2, and the bales are so arranged with relation to the bars 4 that when the rope or cable is stretched across the platform it will be directly over the centers of the bundles and in convenient position to secure the swivel-bars to said bale when it is desired to lift them.

We preferably provide the groove 2 in the center of the platform and incline the platform slightly toward the edges of said groove for the purpose of more easily guiding the carrier, which is formed of steel, which rides in said groove to direct the movement of said carrier in a straight line throughout the length of the platform.

In operation the cable 15 is secured to one of the hooks 17 on the bars 4 and carried across the platform and passed downwardly through one of the pulleys, and at its lower end is secured to one of the small drums, the said cable meantime being slackened, causing the pulley-block 18 to move by gravity to the center of the platform, where the swivel-bars are secured to a bale of cane. The shaft 10 is then revolved in a direction to lift the cable and draw the same taut, at the same time lifting the pulley-block and the bundle of cane secured to the swivel-bars on said block. When one row of bales or bundles has been loaded upon the carrier, the cable 15 is detached from one of the pulleys and one of the eyes and transferred to the next upright, where it is secured to another eye and carried over another pulley and secured to the drum below said pulley, and the shaft is again turned. This operation is repeated throughout the entire length of the platform until all the bales or bundles have been loaded upon the carrier.

We do not desire to limit ourselves to the exact construction illustrated in the drawings, and many modifications will suggest themselves and be made without departing from the spirit of our invention.

Any well-known power may be utilized to rotate the shaft—as, for instance, the cables which surround the drum may extend to a source of steam-power.

Having thus fully described our invention, what we claim, and desire to secure by Letters Patent, is—

1. In a device of the character set forth, the combination of two oppositely-disposed frames or supports, a rotatably-mounted shaft in one of said frames, drums on said shaft, pulleys on the frame in which said shaft is mounted located above said shaft, a cable provided with means for connecting it at different points on the other of said frames, and adapted to pass around one of said pulleys and be connected to one of said drums, a pulley-block on said cable, and attaching means on said block.

2. The combination with a platform having a longitudinal groove therein, the upper surface of said platform converging toward said groove, of a pair of frames or supports secured to said platform upon opposite sides thereof, a rotatably-mounted shaft on one of said frames, drums on said shaft, pulleys on the frame in which said shaft is mounted located above said shaft, attaching means on the other of said frames located at different points thereon, a cable adapted to be connected at one end to said attaching means, to pass around one of said pulleys and to be attached to one of said drums, a pulley-block on said cable, and attaching means on said block, as and for the purpose set forth.

3. A device of the character described, comprising a series of upright bars 4 provided near their upper ends with eyebolts, or their equivalents, a series of upright bars 7 arranged opposite the spaces of the upright bars 4, a cross-bar connecting the ends of the bars 7, pulley-blocks secured to said cross-bar between the upright bars, a shaft secured to the upright bars below the cross-bar, drums or pulleys carried on said shaft, a rope or cable removably secured to one of the eyebolts and extending through one of the pulleys, and removably secured to one of the drums, means carried by the cable adapted to be secured to the bale or bundle, and means for rotating the shaft, whereby the cable is wound upon one of the drums, and the bale lifted, substantially as described.

4. A device of the character described comprising a series of upright bars 4 provided near their upper ends with eyebolts or their equivalents, a series of upright bars arranged opposite the spaces of the upright bars 4, a cross-bar connecting the ends of the bars 7, pulley-blocks secured to said cross-bars between the upright bars, a shaft journaled in suitable bearings upon the upright bars below the cross-bar, drums or pulleys carried on said shaft, a rope or cable removably secured to one of the eyebolts and extending through one of the pulleys and removably secured to one of the drums, said rope or cable being adapted to be secured to the eyebolts and passed through the pulleys and be secured to the drums throughout the entire length of the device for the purpose set forth, a pulley upon said cable and means carried by said pulley for attaching the same to bundles of cane, or the like, and means for rotating the shaft, whereby the cable is wound upon one of the drums and the pulley lifted, substantially as shown and for the purpose set forth.

In testimony whereof we have signed this specification in the presence of two subscribing witnesses.

DORIFOR WEBRE.
STEPHENS HAYDEL.

Witnesses:
  A. I. BREEM,
  JOSEPH DAMARÉ.